INVENTORS
HAROLD OSTERBERG
RAOUL F. VAN LIGTEN
ATTORNEY

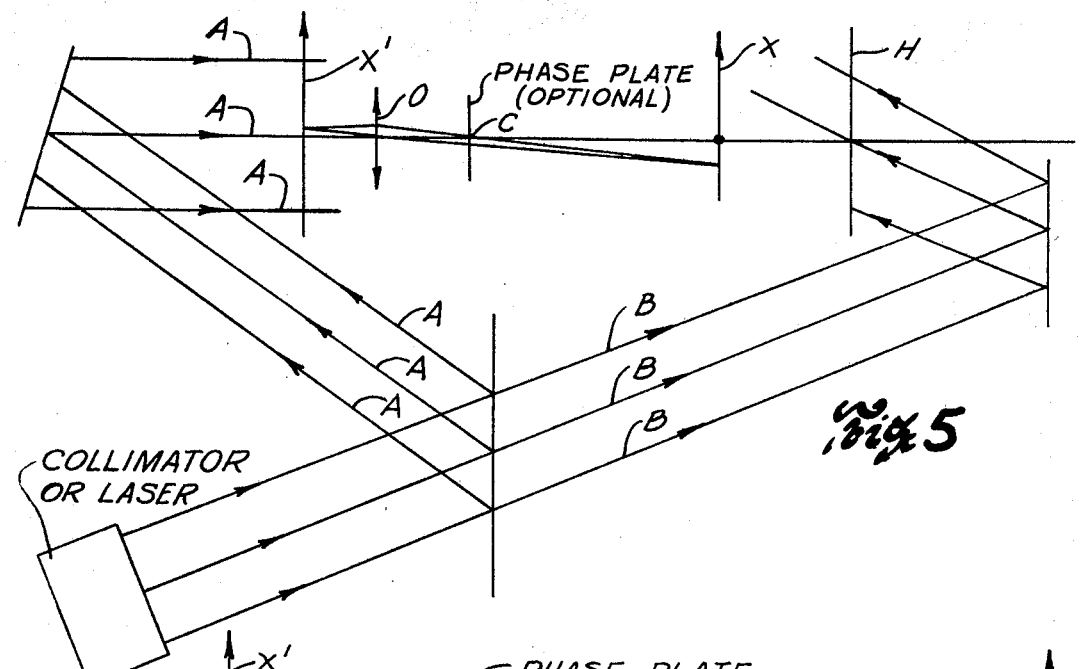
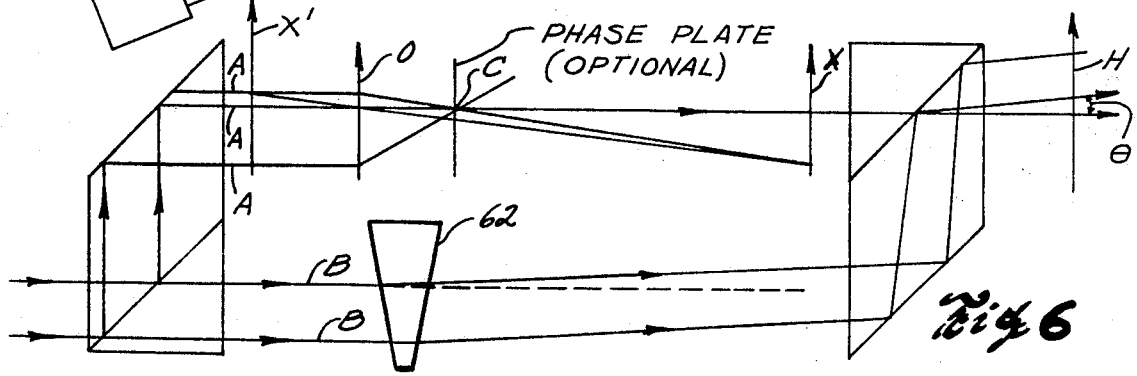
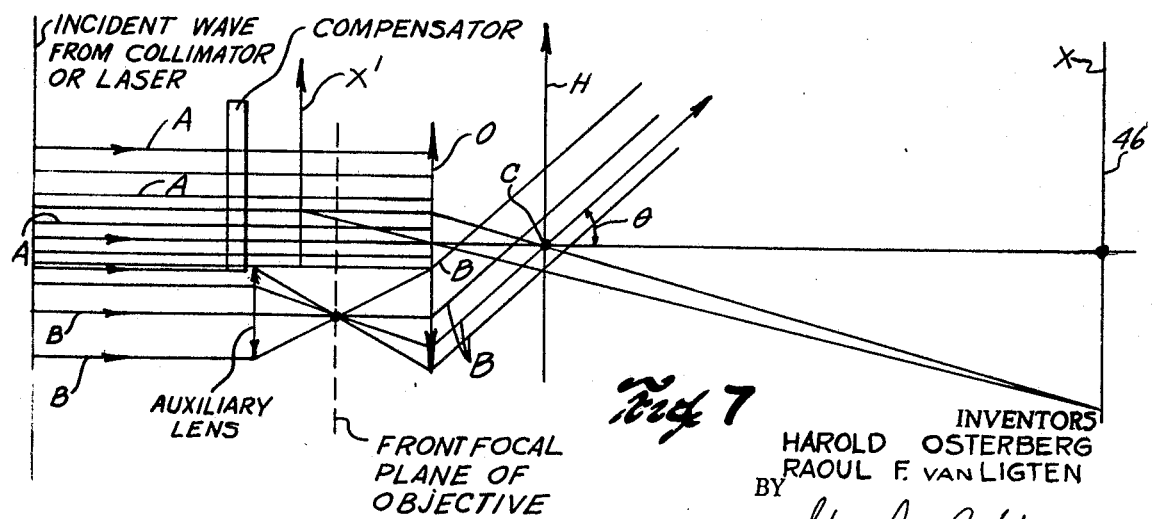

United States Patent Office 3,511,554
Patented May 12, 1970

3,511,554
HOLOGRAPHIC MICROSCOPE
Harold Osterberg, Sturbridge, and Raoul F. Van Ligten, Worcester, Mass., assignors, by mesne assignments, to American Optical Corporation, Southbridge, Mass., a corporation of Delaware
Filed Apr. 29, 1966, Ser. No. 546,241
Int. Cl. G02b 21/06, 21/14, 23/00
U.S. Cl. 350—12          2 Claims

ABSTRACT OF THE DISCLOSURE

A hologram recording apparatus for producing a magnified hologram of a microscopic object, this being achieved by magnifying and imaging the microscopic object, followed by recording a hologram of this magnified image.

---

This invention relates generally to microscopy and microscope systems and more specifically to the use of the principles of holography in a microscope system.

The phenomenon of holography can be understood by reference to an article in the Journal of the Optical Society of America, vol. 53, page 1377 (1963). In that article, E. Leith and J. Upatnieks describe a method for producing a hologram using an object transparency illuminated with coherent light to produce a Fresnel diffraction pattern of the object on a film. Adjacent to the object, a prism intersects half of the coherent beam and deviates it through an angle sufficient to superimpose it, with the object bearing portion of the beam, on the film. (It should be noticed that neither a microscope system nor any objective lens means are suggested.) The film acts as a square law detector in recording the interference pattern produced by the object beam and the reference beam; this reference beam is deviated around the object. The film, which can be developed by ordinary photographic techniques, is referred to as a hologram of the object. When the hologram is illuminated with coherent light it produces real and virtual images of the object which are three-dimensional reproductions of the object.

The object beam can be looked upon as partially deviated and partially undeviated by the object, with the undeviated portion interfering with the reference beam to produce pure undisturbed fringes, which are disturbed by the deviated portion of the object beam. The film then records the absolute value, squared, of the amplitude-phase distribution in the resultant fringe pattern. Consequently, the hologram can be thought of as a diffraction grating with the film producing a zero-order spectrum and a pair of strong first order spectra. One of the first order spectra produces a real image and the other a virtual image. Whereas a conventional diffraction grating has only inadvertently introduced irregularities which give rise to undesired ghost lines, the hologram diffraction grating has irregularities which are deliberately introduced to permit the formation of complete, well-defined images.

For many years the microscope has been used to aid in the analysis of such things as biological specimens. These microscope systems have sufficed, but with an important drawback, which is the lack of a capability for perception in substantial depth in a single viewing or exposure. With, for example, biological specimens it could be extremely important to determine the details of the specimen at various depth stages by use of a single exposure of the specimen and to be able to preserve the exposure as a complete record for future reference in three dimensions, without the necessity of preserving the specimen itself.

Accordingly a primary object of the present invention is to provide a viewing arrangement and a microscope system which lends itself to the viewing and preservation of a specimen in three dimensions.

A further object is to provide sharp reconstructed microscope images.

These and other objects are accomplished in one illustrative embodiment of the invention wherein a halographic microscope is provided to produce on photographic film and/or for instant viewing an image of an object specimen which may be recorded so that it can be reproduced in three dimensions. The hologram is produced with angularly intersecting reference and object beams, with an objective lens in the path of the object beam for focusing it with the image on the recording medium.

Other objects, features and embodiments of the invention are contemplated and will be apparent from the following more detailed description of the invention and reference to the accompanying drawings, wherein, FIG. 1 is a holographic microscope representation showing a preferred embodiment of the present invention;

FIG. 5 is a schematic representation of a holographic microscope wherein light impinges upon the hologram film from opposite sides as in the embodiment of FIG. 2 but with more capability for flexibility in the system;

FIG. 6 is a schematic representation of an embodiment similar to that shown in FIG. 1 but with additional flexibility features; and, FIG. 7 is an optical schematic of a highly compact intereference microscope using the principles of holography according to the present invention.

Figure 1:
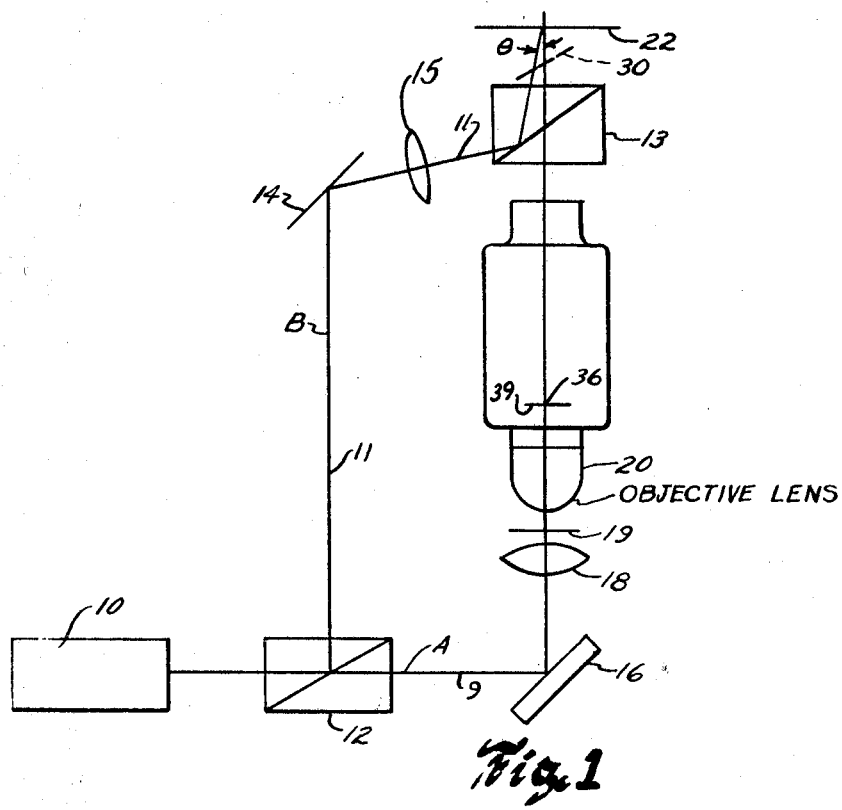
FIG. 1A is an embodiment of reconstruction apparatus for the hologram produced by such means as is shown in FIG. 1.

The representation of FIG. 1 includes a coherent light source (laser) 10, beam splitters 12, beam combiner 13, mirrors 14 and 16, condenser 18, an objective lens 20 and a holographic film 22. The laser directs coherent light to a means for splitting the light 12 into an object beam 9 (using the convention A throughout this specification) and a reference beam 11 (B). The object beam 9 is further directed by mirror 16 through directing means (e.g., a condenser) 18 and then through an object transparency 19, and then into the focusing means (objective) 20. The reference beam 11 is directed by mirror 14 through beam spreader optics 15 to the beam combiner 13 for interference with the object beam. The object and reference beams are then directed to the hologram recording medium (film) 22. A removable mirror 30 may be placed as shown in the drawing for reading the exposure time and/or ratio between energy in object and reference beams through an eyepiece (not shown). Also, in this and other nonphase microscope embodiments, the condenser 18 may be eliminated to provide greater symmetry in the optical paths. For phase (or other type) microscopes glass may be added to the reference beam path to equalize optical path lengths. Furthermore, it should be understood that the image of the object 19 is focused by objective 20 (or a Fresnel zone plate) to an image volume (which could be before, after or including the recording medium plane), which includes one or more image planes transversely disposed to and including the axis of object beam 9.

Figure 1A:
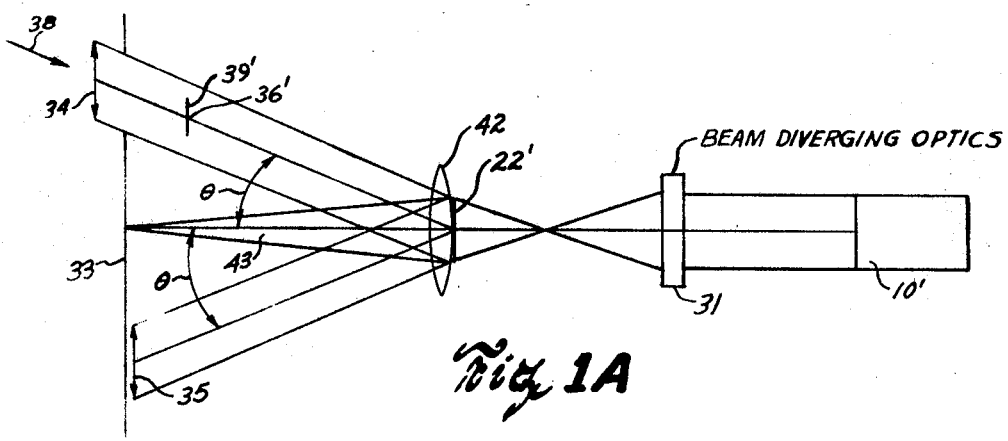

It may be seen from FIG. 1 that the reference beam 11 is directed by mirror 14 to beam combiner 13 and then to the recording medium 22 to intersect the plane of the recording medium at an angle $\theta$ with the object beam 9. The angle $\theta$ should at least be of a magnitude to subtend half of the transverse dimension of any of the image planes. The inclusion of this angle between reference and object beams assists in making possible the separation of the virtual and real images and the blocking of zero-order or background light 43 as can be seen by reference to FIG. 1A. The drawing of FIG. 1A represents an embodiment of a reconstruction apparatus useful with hologram apparatus such as that shown in FIG. 1. A coherent light source 10' is directed through beam diverging optics 31 to the exposed hologram 22', and then through such means as lens 42. A mask 33 may be included to occlude either the real image 34 or the virtual image 35 so that the other image (real or virtual) may be seen without interference. Also, the background illumination or zero-order light 43 is substantially eliminated from the view of an observer 38 by mask 33. The mask 33 is spatially located at the conjugate of the reconstruction light source 10', which is adapted and arranged to illuminate the complete hologram 22' with a coherent wave front. Also, it should be understood that the observer is meant to include means for focusing on the real or virtual image (whichever is not occluded by mask 33).

It is contemplated that one could mount a phase plate 39' at the reconstructed image 36' of the conjugate of light source 10 to accomplish phase microscopy on a macroscopic scale. The observer 38 (an instrument used by a human or other observer) then becomes a phase macroscope of the magnified reconstructed image. One could also introduce a knife edge at 36' to perform schlieren imagery and oblique dark-field illumination. Central dark-field is attained by putting an opaque mask at point 36'.

Phase microscopy as well as dark-field and oblique dark-field illumination can also be applied while making the hologram (see FIG. 1), by placing a phase plate 39 at the conjugate 36 of the light source 10 for dark-field and oblique dark-field. The aforementioned mask technique can be used in the appaartus of FIG. 1.

Figure 2:
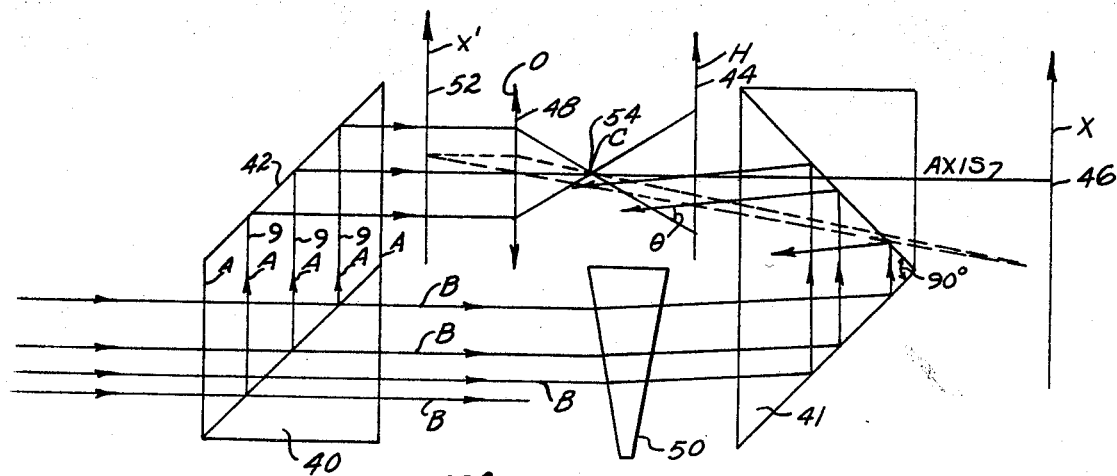
FIG. 2 is an optical schematic of a compact embodiment of the present invention.

A more compact arrangement of the halographic microscope is depicted by the schematic of FIG. 2 wherein prisms 40 and 41 are useful with mirror 42 for establishing an image recordable on the halographic film 44 (H) and an aerial image 46 (X) by impinging object and reference light onto opposite sides of the film. The system of FIG. 2 also includes means for magnifying said object light [e.g., an objective 48 (O)] and tiltable wedge 50. The object specimen 52 (X') is placed to intersect the object beam 9 and the location of the conjugate point 54 (C) of the light source is depicted and illustrates the point at which a phase plate may be placed to convert the system to a phase microscope.

Figure 3:
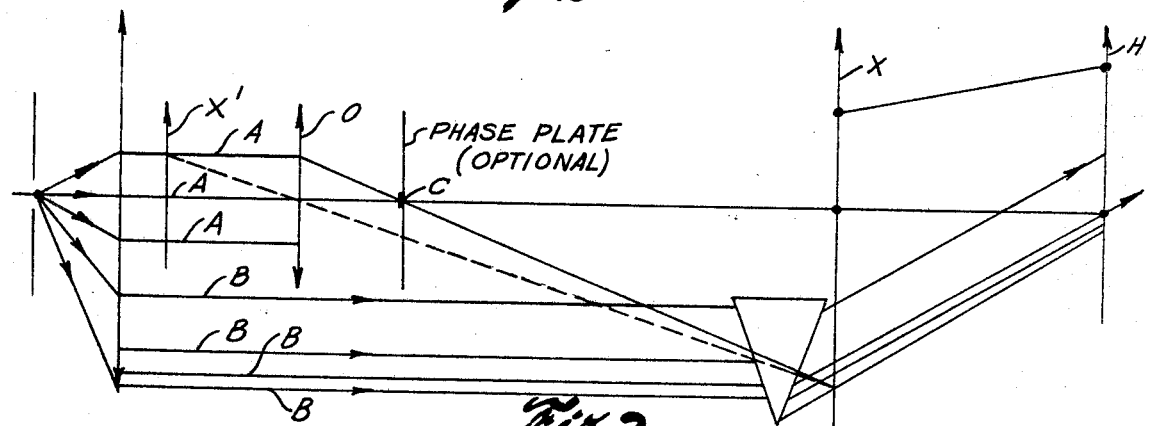
FIG. 3 is a still more compact embodiment of the present invention.

The embodiment of FIG. 3 is even more compact (for low magnifications) than that of FIG. 2 and, like FIG. 1, illustrates a system wherein both the object (A) and reference (B) beams impinge upon the hologram film (H) on the same side.

Figure 4:
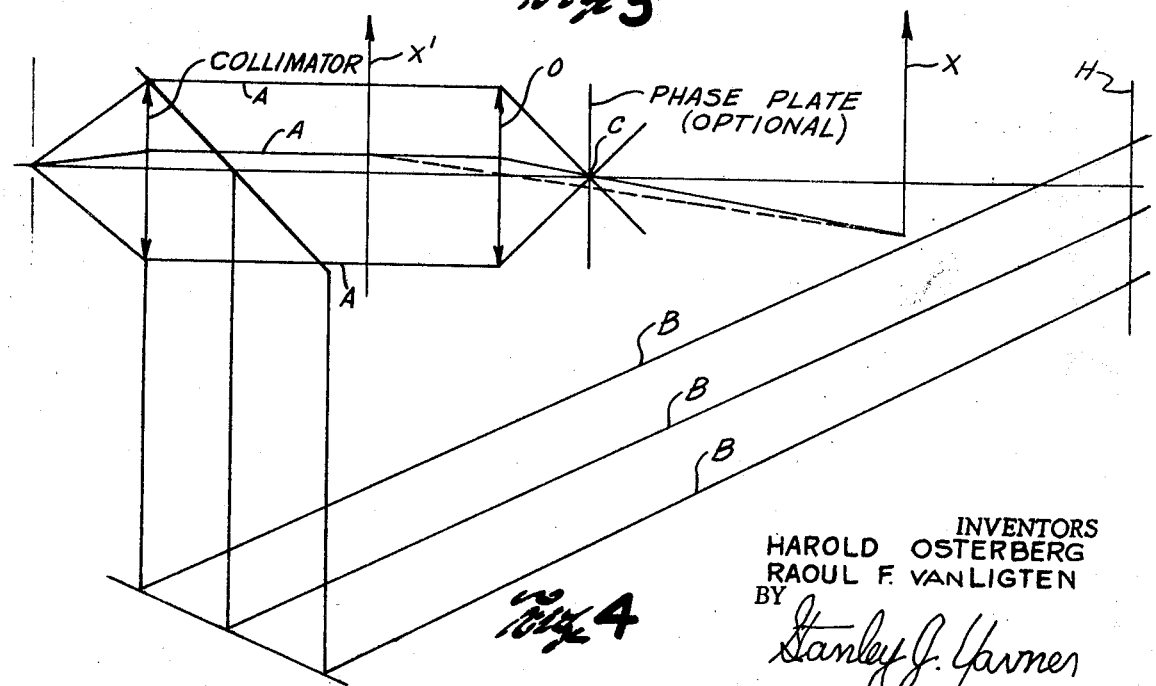
FIG. 4 is a schematic representation of an embodiment of the present invention which is less compact than those embodiments shown in FIGS. 2 and 3 but which features the capability of additional flexibility.

FIG. 4 represents a relatively less compact embodiment which allows for the capability of flexibility by placing such additional equipment as might be used for producing a spherical wave front of the reference beam (B) at the hologram film (H).

The embodiment of FIG. 5 is likewise less compact but provides a reference beam (B) on the opposite side of the hologram film from the object beam (A).

The embodiment of FIG. 6 is relatively less compact, as in the embodiment of FIG. 1, but provides additional flexibility in using the wedge 62 for changing the reference beam angle $\theta$.

A still further embodiment is shown in FIG. 7 wherein there is provided an interference microscope of extreme compactness which, like the embodiment of FIG. 2, provides an aerial image 46' in a position for viewing with an eyepiece without obstruction as might be the case if an attempt is made to view the aerial image when the reference and object beams are directed to opposite sides of the hologram film.

We claim:
1. A holographic microscope for recording and preserving on film three-dimensional images of object transparencies, said microscope comprising a source of coherent light, beam-splitting means for dividing said light into two different coherent light beams angularly related to each other, optical means for directing one of said light-beams along a first optical path to and through an object transparency at an object plane of said microscope, an objective in said first optical path arranged to receive light passing beyond said object transparency and to image same at an image volume adjacent a predetermined recording medium plane of said microscope, said image volume including a plurality of different image planes longitudinally displaced along said first optical path and disposed in transverse relation thereto, holographic recording medium disposed in said first path at said recording medium plane, light-directing means arranged to direct the other of said light beams as a reference beam from said beam-splitting means along a second optical path to said recording medium plane, said light-directing means including a light-combining component disposed in said first optical path between said objective and said recording medium plane and so positioned therein as to cause the light of said reference beam to have at said recording medium plane and included angle between said first and second optical paths which is of such a magnitude as to subtend at any of said image planes at least one-half of the transverse dimension of the image thereat, light-diverging means in said reference beam arranged to cause the light thereof to have a transverse dimension equal to that of any image at said image plane, whereby interference between said beams at said recording medium planes will occur and the angular relationship between said beams will be such as to provide real and virtual images upon said recording medium which are substantially free from zero order background light interference.

2. The invention according to claim 1 wherein a phase plate is placed substantially in a plane to include a point conjugate to said said light source for causing the system to function as a phase microscope.

References Cited

UNITED STATES PATENTS 2,679,474  5/1954  Pajes.
2,770,166  11/1956  Gabor.
3,107,170  10/1963  Netke.

(Other references on following page)

OTHER REFERENCES

Leith et al.: "Microscopy by Wave Front Reconstruction," Journal of the Optical Society of America, vol. 55, No. 8, August 1965, pp. 981–986.

Baez; "Fresnel Zone Plate for Optical Image Formation Using Extreme Ultraviolet and Soft X-Radiation," Journal of the Optical Society of America, vol. 51, No. 4, April 1961, pp. 405–312.

Denisyuk; "Photographic Reconstruction of the Optical Properties of an Object in Its Own Scattered Radiation Field," vol. 7, No. 8, Physics, December 1962, pp. 543–545.

Leith et al.: "Wave Front Reconstruction with Continuous-Tone Objects," Journal of Optical Society of America vol. 53, No. 12, December 1963, pp. 1377–1381.

Mannheim: "Laser inder Photographie," Photo-Technik und Wirtschaft (April) Na4–1965, vol. 16, pp. 131–134.

Leith et al.: "Photography Laser," Scientific American, June 1965, vol. 212, No. 6, pp. 34–35.

Lanza: I.B.M. Technical Disclosure Bulletin, April 1966, vol. 8, No. 11.

PAUL R. GILLIAM, Primary Examiner

U.S. Cl. X.R.

350—13, 3.5, 33, 162